Aug. 21, 1956 — L. O. YSTENES — 2,759,298

TRUNDLE

Filed Nov. 6, 1953

INVENTOR.
LLOYD YSTENES
BY
Patrick D Beavers
ATTORNEY

United States Patent Office 2,759,298
Patented Aug. 21, 1956

2,759,298

TRUNDLE

Lloyd O. Ystenes, Bejou, Minn.

Application November 6, 1953, Serial No. 390,500

1 Claim. (Cl. 46—220)

This invention relates to improvements in toys of the moving, outdoor type and involves the provision of means for utilizing old and discarded vehicle tires for amusement purposes.

The primary object of my invention is to provide a frame and means rotatably carried by the frame for securely mounting a pair of used automotive tires of any size on the frame in a manner so that the frame is made mobile and can be moved about for amusement purposes by children.

A further object of my invention is to provide a simply constructed and extremely inexpensive device which embodies a U-shaped frame having lateral outwardly projecting stub axles on journal ends on which carriers are rotatably mounted and which have means for engaging the side wall of used tires so that the frame is mobilized.

These and ancillary objects are attained by my invention, the preferred embodiment of which is set forth in the following description and illustrated in the accompanying drawing, wherein.

Figure 1:
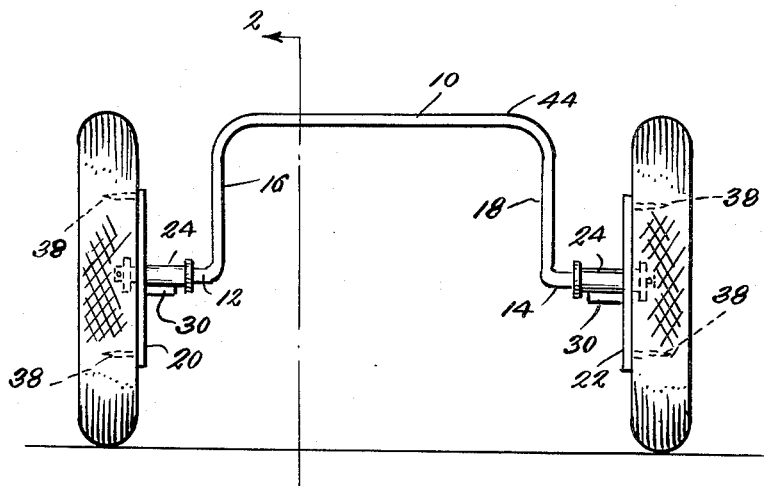
Figure 1 is a front elevational view of the toy.
Figure 5:
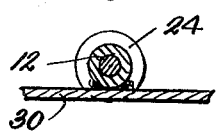
Figure 5 is a cross-sectional view taken on line 5—5 of Figure 4.
Figure 2:
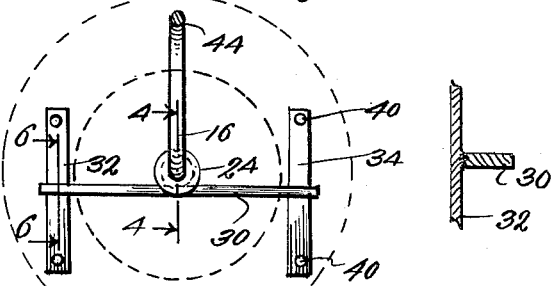
Figure 2 is a vertical sectional view taken on line 2—2 of Figure 1.
Figure 6:
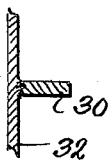
Figure 6 is a detailed sectional view taken on line 6—6 of Figure 2.

Referring more particularly to the accompanying drawing, the numeral 10 designates a U-shaped frame which has outwardly projecting stub axles or ends 12 and 14 formed integral with the legs 16 and 18 thereof. The axles 12 and 14 project laterally and receive rotatably mounted carriers 20 and 22.

Each of the carriers is identically formed and, as shown in Figures 3–7, the carrier 20 includes a bushing 24 which is rotatably circumposed on the stub axle 12 and is located axially thereon by the leg 16 and by a cotter pin 26 inserted in a diametrical opening 28 in the axle.

Figure 3:
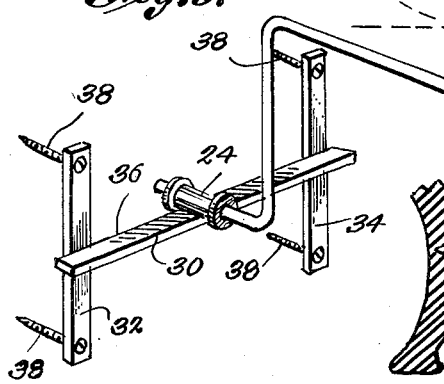
Figure 3 is a perspective view of one end of the frame.
Figure 4:
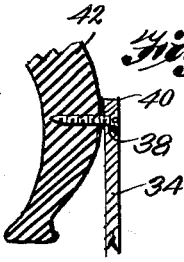
Figure 4 is a vertical sectional view taken on line 4—4 of Figure 2.
Figure 7:
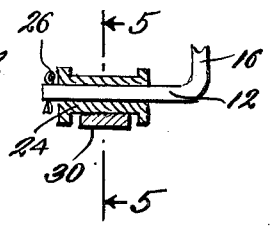
Figure 7 is a detailed sectional view showing the manner of attaching a tire to the carrier.

The bushing 24 has a bar 30 welded at its center to the outer surface thereof and extending transversely thereof intermediate its flanged ends. As shown in Figure 3, the bar 30 is welded to flat arms 32 and 34, which are arranged at right angles to the bar adjacent its ends. The arms 32 and 34 are affixed to the outer side edge 36 of the bar and carry means at their opposite ends for securely mounting a tire thereon.

The means includes screws 38 which are disposed through openings 40 in the arms, the openings being counterbored so that the heads of the screws are embedded in the inner side walls 42 of a pair of opposing used automobile tires.

In this fashion, the tires are rotatably mounted on the stub axles 12 and 14 providing the mobile means for the frame, the web or bight portion 44 of which is grasped by the hands of the child to propel the frame. It will be apparent that the bight portion 44 acts as a handle and that it may be raised or lowered with respect to the ground, thus making it suitable for children of all sizes.

Due to the length of the arms and placement of the screws, the carrier can be mounted on any size of tire.

Thus, I have provided a simple toy which uses used and discarded tires, which are held by the carriers in upright position, the tires being held from wobbling and, due to the threaded engagement of the self-tapping screws, being securely attached to the carriers.

While the best known form of my invention has been disclosed herein, other forms may be realized as come within the scope of my invention defined by the appended claim.

What is claimed is:

For use with a pair of automotive tires, an amusement device comprising a U-shaped frame having lateral outwardly extending stub axles on the free ends of its legs, bushings rotatably mounted on the stub axles, carriers carried by the bushings and means on said carriers for engaging the side walls of automotive tires to hold the tires in upright ground engaging positions, said carriers including a bar secured transversely to the bushings and arms secured to the ends of each bar and extending at right angles thereto and carrying said last means, said last means including threaded screws extending through the end portions of each bar threadably engageable in the side walls of the tires.

References Cited in the file of this patent

UNITED STATES PATENTS

| | | |
|---|---|---|
| 735,984 | Kenter | Aug. 11, 1903 |
| 1,477,333 | Erven | Dec. 11, 1923 |
| 1,642,502 | Krasberg | Sept. 13, 1927 |